(12) United States Patent
Hebron et al.

(10) Patent No.: US 11,632,791 B2
(45) Date of Patent: *Apr. 18, 2023

(54) TRANSMISSION RESOURCE ALLOCATION BY SPLITTING PHYSICAL RESOURCE BLOCKS

(71) Applicant: Cohere Technologies, Inc., Santa Clara, CA (US)

(72) Inventors: Yoav Hebron, Santa Clara, CA (US); Christian Ibars Casas, Santa Clara, CA (US); Ronny Hadani, Santa Clara, CA (US); Shachar Kons, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,539

(22) Filed: Apr. 29, 2022

(65) Prior Publication Data

US 2022/0408443 A1 Dec. 22, 2022

Related U.S. Application Data

(63) Continuation of application No. 16/638,873, filed as application No. PCT/US2018/046745 on Aug. 14, 2018, now Pat. No. 11,324,008.

(Continued)

(51) Int. Cl.
*H04L 5/00* (2006.01)
*H04W 72/53* (2023.01)
(Continued)

(52) U.S. Cl.
CPC ........... *H04W 72/53* (2023.01); *H04L 5/0023* (2013.01); *H04L 5/0039* (2013.01);
(Continued)

(58) Field of Classification Search
CPC ............. H04W 72/53; H04W 72/0446; H04W 72/0453; H04W 72/0493; H04W 72/08;
(Continued)

(56) References Cited

U.S. PATENT DOCUMENTS

| | | |
|---|---|---|
| 4,754,493 A | 6/1988 | Coates |
| 5,083,135 A | 1/1992 | Nagy et al. |

(Continued)

FOREIGN PATENT DOCUMENTS

| | | |
|---|---|---|
| WO | 2011150315 | 12/2011 |
| WO | 2013148546 | 10/2013 |

(Continued)

OTHER PUBLICATIONS

Banelli, P. et al., "Modulation Formats and Waveforms for 5G Networks: Who Will Be the Heir of OFDM?," IEEE Signal Processing Magazine, vol. 81, pp. 80-93, Nov. 2014.

(Continued)

*Primary Examiner* — Thai Nguyen
(74) *Attorney, Agent, or Firm* — Perkins Coie LLP

(57) ABSTRACT

Methods, systems and devices for providing transmission resources that achieve transmission diversity while reducing pilot signal overhead are described. An exemplary wireless communication method may be implemented in a wireless communication system in which transmission resources are allocated on a per physical resource block (PRB) basis, where a PRB corresponds to a two dimensional resource pattern comprising a first number of subcarriers along a frequency dimension and a second number time slots along a time dimension. The method includes logically dividing subcarriers in each PRB into an integer number of sub-groups of sub-carriers, wherein the integer number is greater than one, allocating, to a transmission, transmission resources corresponding to one or more of the sub-groups of (Continued)

subcarriers, performing the transmission in the wireless communication system.

20 Claims, 6 Drawing Sheets

Related U.S. Application Data

(60) Provisional application No. 62/545,398, filed on Aug. 14, 2017.

(51) Int. Cl.
*H04W 72/0446* (2023.01)
*H04W 72/0453* (2023.01)

(52) U.S. Cl.
CPC ....... *H04L 5/0051* (2013.01); *H04W 72/0446* (2013.01); *H04W 72/0453* (2013.01)

(58) Field of Classification Search
CPC ............. H04W 72/1289; H04L 5/0023; H04L 5/0039; H04L 5/0051; H04L 5/0044; H04L 5/0048; H04L 5/0053; H04L 5/0007

See application file for complete search history.

(56) References Cited

U.S. PATENT DOCUMENTS

| | | |
|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,327,812 B2 | 2/2008 | Auer |
| 7,392,018 B1 | 6/2008 | Ebert et al. |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,667,307 B1 | 5/2017 | Hadani et al. |
| 9,668,148 B2 | 5/2017 | Hadani et al. |
| 9,712,354 B2 | 7/2017 | Hadani et al. |
| 9,722,741 B1 | 8/2017 | Rakib et al. |
| 9,729,281 B2 | 8/2017 | Hadani et al. |
| 10,651,912 B2 | 5/2020 | Wang et al. |
| 10,667,148 B1 | 5/2020 | Hadani et al. |
| 10,681,568 B1 | 6/2020 | Hadani et al. |
| 10,693,581 B2 | 6/2020 | Rakib et al. |
| 10,693,692 B2 | 6/2020 | Hadani et al. |
| 10,716,095 B2 | 7/2020 | Rakib et al. |
| 10,749,651 B2 | 8/2020 | Hebron et al. |
| 10,826,728 B2 | 11/2020 | Tsatsanis et al. |
| 10,855,425 B2 | 12/2020 | Kons et al. |
| 10,873,418 B2 | 12/2020 | Kons et al. |
| 10,886,991 B2 | 1/2021 | Akoum et al. |
| 11,050,530 B2 | 6/2021 | Wang et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsky et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2007/0263752 A1 | 11/2007 | Guey et al. |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |

(56) References Cited

U.S. PATENT DOCUMENTS

| | | |
|---|---|---|
| 2011/0299379 A1 | 12/2011 | Sesia et al. |
| 2011/0305267 A1 | 12/2011 | Riu et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0114425 A1* | 5/2013 | Sayana ............... H04B 7/0413 370/252 |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehran et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0134129 A1* | 5/2017 | You ............... H04L 5/0051 |
| 2017/0149594 A1 | 5/2017 | Rakib et al. |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2017/0288913 A1 | 10/2017 | Rakib et al. |
| 2017/0289961 A1 | 10/2017 | Rakib et al. |
| 2018/0109284 A1 | 4/2018 | Hadani et al. |
| 2018/0167165 A1 | 6/2018 | Kons et al. |
| 2018/0205481 A1 | 7/2018 | Rakib et al. |
| 2018/0227159 A1 | 8/2018 | Rakib et al. |
| 2018/0242170 A1 | 8/2018 | Hadani et al. |
| 2018/0262306 A1 | 9/2018 | Hadani et al. |
| 2018/0288809 A1 | 10/2018 | Delfeld et al. |
| 2018/0302802 A1 | 10/2018 | Fanfelle |
| 2019/0036577 A1 | 1/2019 | Delfeld et al. |
| 2019/0036741 A1 | 1/2019 | Hadani et al. |
| 2019/0044682 A1 | 2/2019 | Hebron et al. |
| 2019/0075551 A1 | 3/2019 | Hadani et al. |
| 2019/0081836 A1 | 3/2019 | Hadani et al. |
| 2019/0159177 A1 | 5/2019 | Rakib et al. |
| 2019/0173617 A1 | 6/2019 | Kons et al. |
| 2019/0173630 A1 | 6/2019 | Kons et al. |
| 2019/0215109 A1 | 7/2019 | Hadani et al. |
| 2019/0238189 A1 | 8/2019 | Delfeld et al. |
| 2019/0327054 A1 | 10/2019 | Kons et al. |
| 2019/0342126 A1 | 11/2019 | Hadani et al. |
| 2019/0342136 A1 | 11/2019 | Hadani et al. |
| 2019/0379422 A1 | 12/2019 | Hadani et al. |
| 2020/0045562 A1 | 2/2020 | Hadani et al. |
| 2020/0100316 A1* | 3/2020 | Liu ............... H04W 72/23 |
| 2020/0119868 A1 | 4/2020 | Rakib et al. |
| 2020/0137774 A1 | 4/2020 | Molisch et al. |
| 2020/0145273 A1 | 5/2020 | Rakib et al. |
| 2020/0153107 A1 | 5/2020 | Rakib |
| 2020/0186875 A1 | 6/2020 | Tsatsanis et al. |
| 2020/0204309 A1 | 6/2020 | Namboodiri |
| 2020/0204410 A1 | 6/2020 | Hadani |
| 2020/0228170 A1 | 7/2020 | Delfeld et al. |
| 2020/0259604 A1 | 8/2020 | Hadani et al. |
| 2020/0259692 A1 | 8/2020 | Hadani et al. |
| 2020/0259697 A1 | 8/2020 | Delfeld |
| 2020/0280138 A1 | 9/2020 | Fanfelle et al. |
| 2020/0287672 A1 | 9/2020 | Namboodiri et al. |
| 2020/0288333 A1 | 9/2020 | Rakib et al. |
| 2020/0305010 A1 | 9/2020 | Hadani et al. |
| 2020/0313695 A1 | 10/2020 | Namboodiri et al. |
| 2020/0313949 A1 | 10/2020 | Hadani |
| 2020/0322185 A1 | 10/2020 | Kons et al. |
| 2020/0322202 A1 | 10/2020 | Hadani et al. |
| 2020/0351836 A1 | 11/2020 | Rakib et al. |
| 2020/0367252 A1 | 11/2020 | Hebron et al. |
| 2020/0389268 A1 | 12/2020 | Sathyanarayan et al. |
| 2020/0403829 A1 | 12/2020 | Namboodiri et al. |
| 2021/0028877 A1 | 1/2021 | Rakib et al. |
| 2021/0036823 A1 | 2/2021 | Hebron et al. |
| 2021/0058114 A1 | 2/2021 | Molisch et al. |
| 2021/0077625 A1 | 3/2021 | Kons et al. |
| 2021/0105155 A1 | 4/2021 | Kons et al. |
| 2021/0126750 A1 | 4/2021 | Kons et al. |
| 2021/0135905 A1 | 5/2021 | Kons et al. |
| 2021/0194732 A1 | 6/2021 | Kons et al. |

FOREIGN PATENT DOCUMENTS

| | | |
|---|---|---|
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011455 | 1/2017 |
| WO | 2017011478 | 1/2017 |
| WO | 2017044501 | 3/2017 |
| WO | 2017087706 | 5/2017 |
| WO | 2017100666 | 6/2017 |
| WO | 2017147439 | 8/2017 |
| WO | 2017165697 | 9/2017 |
| WO | 2017173160 | 10/2017 |
| WO | 2017173389 | 10/2017 |
| WO | 2017201467 | 11/2017 |
| WO | 2018031938 | 2/2018 |
| WO | 2018031952 | 2/2018 |
| WO | 2018032016 | 2/2018 |
| WO | 2018064587 | 4/2018 |
| WO | 2018064605 | 4/2018 |
| WO | 2018106731 | 6/2018 |
| WO | 2018129554 | 7/2018 |
| WO | 2018140837 | 8/2018 |
| WO | 2018191309 | 10/2018 |
| WO | 2018200567 | 11/2018 |
| WO | 2018200577 | 11/2018 |
| WO | 2019014332 | 1/2019 |

(56) References Cited

FOREIGN PATENT DOCUMENTS

| | | |
|---|---|---|
| WO | 2019032142 | 2/2019 |
| WO | 2019032605 | 2/2019 |
| WO | 2019036492 | 2/2019 |
| WO | 2019051093 | 3/2019 |
| WO | 2019051427 | 3/2019 |
| WO | 2019055861 | 3/2019 |
| WO | 2019068053 | 4/2019 |
| WO | 2019089986 | 5/2019 |
| WO | 2019113046 | 6/2019 |
| WO | 2019157230 | 8/2019 |
| WO | 2019173775 | 9/2019 |
| WO | 2019241436 | 12/2019 |
| WO | 2019241589 | 12/2019 |
| WO | 2020142520 | 7/2020 |
| WO | 2020206304 | 10/2020 |
| WO | 2020227619 | 11/2020 |
| WO | 2020247768 | 12/2020 |
| WO | 2021026212 | 2/2021 |
| WO | 2021062354 | 4/2021 |

OTHER PUBLICATIONS

El Hattachi, R. et al., "NGMN 5G Initiative White Paper," NGMN Alliance, Feb. 17, 2015. [Online], Available: https://www.ngmn.org/uploads/media/NGMN_5G_White_Paper_V1_0.pdf, 125 pages.

Rusek, F. et al., "Scaling Up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).

"AT&T Annual Report 2014," Opening Our Network [Online], Retrieved from the Internet: Sep. 22, 2016. <URL: http://www.att.com/Investor/ATT_Annual/2014/att_introduces_new_concepts_for_telecom_network.html>, 5 pages.

Catt, "ULACK/NACK transmission methods for LTE-A," 3GPP TSG RAN WG1 Meeting #60bis, R1-102453, Beijing, China, Apr. 12-16, 2010, 8 pages.

Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.

Mecklenbrauker, W., "A Tutorial on Non-Parametric Bilinear Time-Frequency Signal Representations," In: Time and Frequency Representation of Signals and Systems, Longo, G et al. (eds.), Springer-Verlag Wien, vol. 309, pp. 11-68 (1989).

Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.

\* cited by examiner

TRANSMISSION RESOURCE ALLOCATION BY SPLITTING PHYSICAL RESOURCE BLOCKS

CROSS-REFERENCE TO RELATED APPLICATIONS

This patent document is a continuation of U.S. patent application Ser. No. 16/638,873, filed Feb. 13, 2020, which is a 371 National Phase Application of PCT Application No. PCT/US2018/046745 entitled "TRANSMISSION RESOURCE ALLOCATION BY SPLITTING PHYSICAL RESOURCE BLOCKS" filed on Aug. 14, 2018 which claims priority to and benefits of U.S. Provisional Patent Application No. 62/545,398, entitled "TRANSMISSION RESOURCE ALLOCATION BY SPLITTING PHYSICAL RESOURCE BOOKS [BLOCKS]," filed on Aug. 14, 2017. The entire content of the before-mentioned patent application is incorporated by reference as part of the disclosure of this patent document.

TECHNICAL FIELD

The present document relates to wireless communication, and more particularly, transmission resource allocation in wireless communication systems.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses techniques for providing transmission resources that achieve transmission diversity while reducing pilot signal overhead.

In one example aspect, a wireless communications method is disclosed. The method may be implemented in a wireless communication system in which transmission resources are allocated on a per physical resource block (PRB) basis, where a PRB corresponds to a two dimensional resource pattern comprising a first number of subcarriers along a frequency dimension and a second number time slots along a time dimension. The method includes logically dividing subcarriers in each PRB into an integer number of sub-groups of sub-carriers, wherein the integer number is greater than one, allocating, to a transmission, transmission resources corresponding to one or more of the sub-groups of subcarriers, performing the transmission in the wireless communication system.

In yet another example aspect, a method of wireless communication, implemented in a wireless communication system in which transmission resources are allocated on a per physical resource block (PRB) basis, where a PRB corresponds to a two dimensional resource pattern comprising a first number of subcarriers along a frequency dimension and a second number time slots along a time dimension, is disclosed. The method includes receiving a transmission on a wireless channel, and demodulating signals occupying sub-groups of subcarriers corresponding to one of a sub-group of subcarriers in which each PRB is logically divided, wherein each PRB is logically divided into an integer number of sub-groups of sub-carriers, wherein the integer number is greater than one.

In another example aspect, a wireless communication apparatus comprising a processor that implements the above-described methods is disclosed.

In yet another example aspect, the method may be embodied as processor-executable code and may be stored on a computer-readable program medium.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document to improve readability of the description and do not in any way limit the discussion or the embodiments to the respective sections only. Furthermore, the term "technique" may refer to a method, and apparatus or a computer program product on which executable code is stored.

In the Long Term Evolution (LTE) and third generation partnership project (3GPP) New Radio (NR), the allocation of resources for data transmissions is done using Physical Resource Blocks (PRBs). A PRB is a logical grouping, defined as 12 consecutive subcarriers by N OFDM symbols. In LTE, N=14 when using a normal cyclic prefix (CP) and 12 when using extended CP. In NR, N can be any number from 2 to 14. The PRB is the smallest allocation size, and additional resources are assigned as multiple contiguous PRBs. When the size of the data to be transmitted is small, a small number of PRBs may be allocated for the transmission. In LTE, such a small or limited allocation of bandwidth corresponds to a small frequency bandwidth. As a result, the transmission of the small packets may not use or exploit the full diversity of the channel.

This document discloses a new approach for partitioning the entire frequency band into PRBs of similar sizes as the LTE PRB. Among other features, this new approach extracts more channel diversity without increasing the overhead of the channel acquisition, and as a result can increase the overall channel throughput. For example, for short transmissions that may occupy only half of the frequency band in a traditional LTE system, the corresponding transmission may be spread over the entire frequency band by allocation transmissions to the transmission of the signal using PRBs of half the size as the traditional system.

Examples of Split PRBs

Using the size of the LTE/NR PRBs, in some embodiments, the PRB can be split into K smaller group, or sub-groups, of subcarriers. The number K is an integer and may represent split level or split count of the PRB. The smaller groups can be equally distributed along the frequency band allocated for the channel. This type of a PRB may be called a Split PRB (S-PRB). In one embodiment K=3. In other embodiments, K can be equal to 2, 4, 6, or 12. In some embodiments, the size of the PRB may be different than 12 subcarriers, and other values of K may be used. An example of a S-PRB of 12 subcarriers with N=14, and K=3 occupying a 10 MHz channel is shown in FIG. 1.

Figure 1:
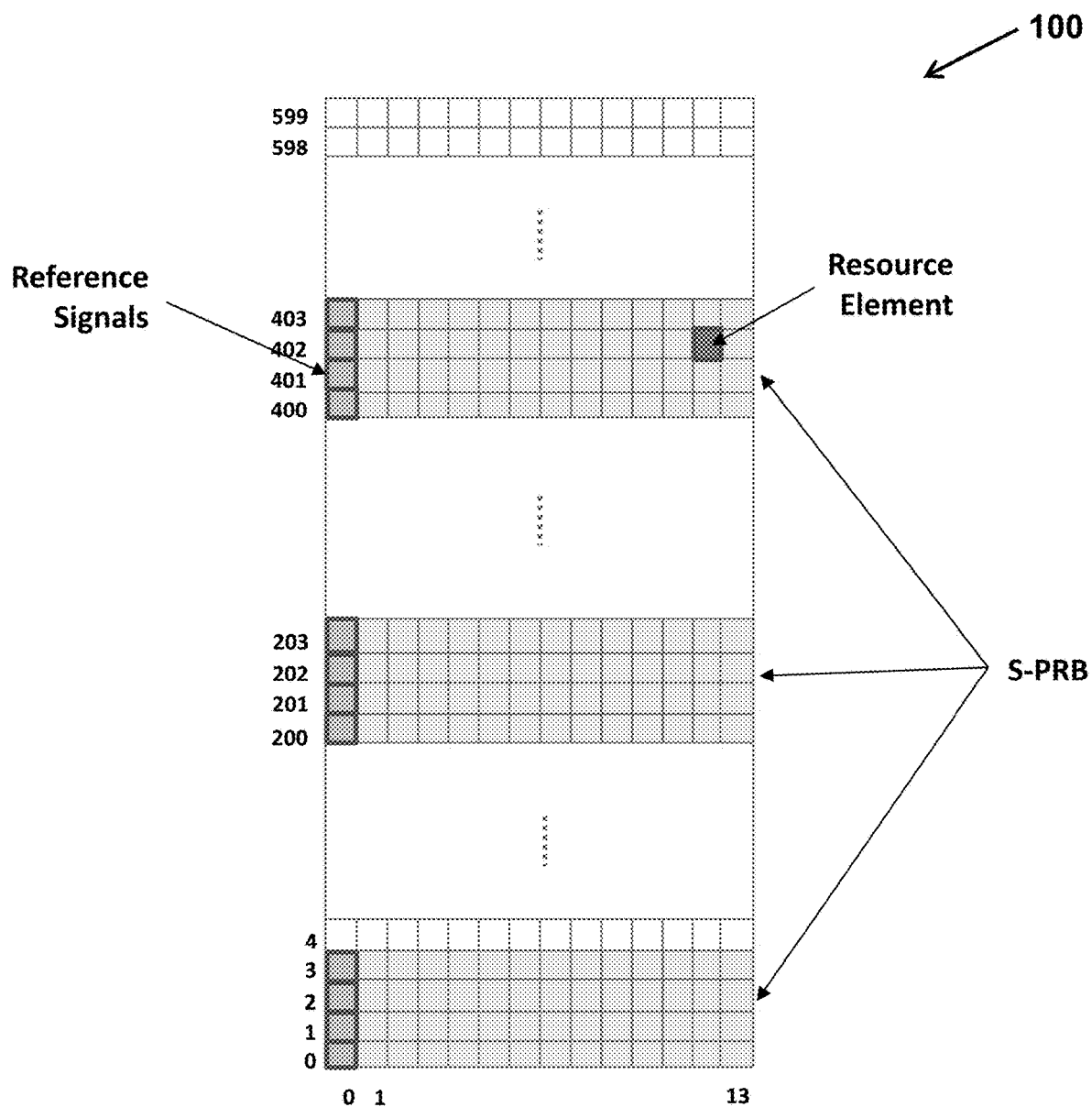
FIG. 1 shows an example of a resource allocation to physical resource blocks.

FIG. 1 shows an example of a resource allocation grid 100 in which resources are allocated to transmissions based on split physical resource blocks. The depicted embodiment example uses S-PRB with K=3 equally spread over a band with 600 subcarriers, supporting 4 demodulation reference signals (DM-RSs). The horizontal axis represents time slots making up a PRB. The vertical axis represents the frequency dimension, with each resource element representing a given subcarrier and a given time slot of the resource allocation grid 100.

FIG. 1 shows the first of 50 S-PRBs that cover the whole band. The first subcarrier group occupies subcarriers 0, 1, 2, 3, 200, 201, 202, 203 . . . 400, 401, 402, 403. The second group of S-PRBs will occupy subcarriers 4, 5, 6, 7, 204, 205, 206, 207, 404, 405, 406, 407. The 50$^{th}$ S-PRB will occupy subcarriers 196, 197, 198, 199, 396, 397, 308, 139, 596, 597, 598, 599. The assignment of S-PRBs as shown in FIG. 1 enables the receiver to extract more of the frequency diversity of the channel compared to the LTE or NR PRB. In some embodiments, when a transmission requires multiple PRBs, the additional S-PRBs can be allocated contiguously. In some embodiments, the allocation could be non-contiguous, e.g. in a pattern that spreads all the allocated S-PRBs along the band equally as much as possible to better extract the channel diversity.

In some embodiments, for a transmission with 4 layers, 4 demodulation reference signals (DM-RSs)—one per antenna port—are transmitted. This is typically implemented in NR using 1 OFDM symbol. When using S-PRBs with K=3, one RE for each antenna port can be assigned to a DMRS in each of the S-PRB sub-sections. In one advantageous aspect, this will allow the estimation of the 4 channels in each of the sub-blocks of S-PRBs without increasing the overhead of the RSs.

The S-PRB structure can be used to support any waveform, including orthogonal frequency division multiplexing OFDM, orthogonal time frequency space OTFS, and OTFS-D. OTFS represents a modulation scheme in which signals are represented in a two dimensional representation along delay-Doppler axis. A symplectic transform may be used for converting signals between delay-Doppler representation and the traditional time-frequency domain representation. Using OTFS, signals representing data and pilots may be allocated along the delay-Doppler plane, and may be converted into time domain signals by transforming using a symplectic Fourier transform.

Figure 2:
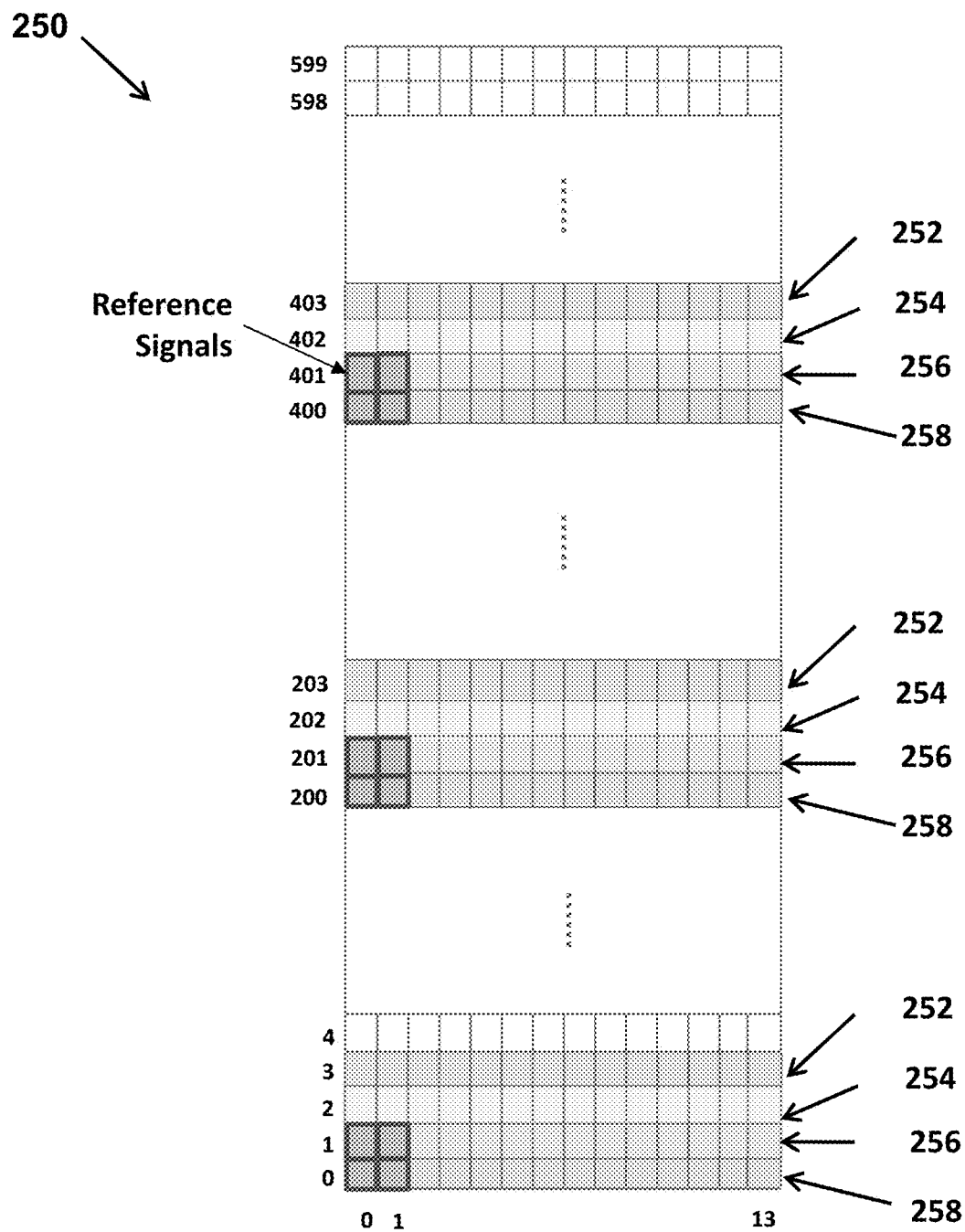
FIG. 2 shows illustrates an example of supporting orthogonal time frequency space (OTFS) signals in the resource allocation pattern of FIG. 1.

When using OTFS and S-PRBs of size 12 subcarriers with K=3, each S-PRB may be divided into 4 OTFS frames. This may be done by allocating the i$^{th}$ row of each S-PRB section to form an OTFS frame (i=0 to K−1). As an example, if a particular transmission is allocated one S-PRB in a configuration with K=3, the data may be split into 4 pieces, and 4 OTFS frames may be transmitted occupying the REs. This example is illustrated in the resource pattern grid 250 example depicted in FIG. 2 which also shows different pilot positions than that of FIG. 2. When a transmission is allocated M PRBs, the total number of OTFS frames used for that transmission will be 4×M. Therefore, FIG. 2 shows an example of OTFS frames when using S-PRBs spread equally along frequency, with 4 DM-RSs and a single PRB allocation. In FIG. 2, each of the colored rows (e.g., rows 252, rows 254, rows 256 and rows 258) represent one OTFS frame.

When using OTFS-D, one OTFS-D frame can cover all the allocated S-PRBs regardless of how they are assigned, and regardless of how many and where the DM-RSs (or other reference signals) are located within each S-PRB.

In some embodiments, the S-PRB scheme may be fixed a priori and used throughout the life of a wireless system. Alternatively, in some embodiments, a technique may be provided to update the S-PRB scheme (or not using S-PRB at all) on a dynamic basis by signaling from the base station to user devices. For example, when the number of legacy devices in a network is above a threshold, or a percent threshold, the legacy PRB scheme may be used (e.g., 12 or 14 subcarriers). When the number of new user devices that are able to receive transmissions using the S-PRB increases beyond a certain percent, then the base station may begin to transmit messages using S-PRB allocation. This change may be indicated to the user device by transmission of an upper layer message. Alternatively, or in addition, the base station may logically divide the available bandwidth into a first portion for supporting communication to/from legacy devices and a second portion for communicating with new devices that implement the S-PRB mechanism. The base station's logical partitioning of the available bandwidth need not be communicated to the user devices because each user device will perform its receptions and transmissions based on allocated resources, without needing to know how the bandwidth is grouped into multiple logical groups by the base station.

In some embodiments, the use of S-PRB may be dependent on the channel characteristics. For example, when a channel frequency response is relatively flat over the entire frequency band, S-PRBs may not be used. When the channel frequency response becomes variable within the allocated frequency band, S-PRBs may be used to that each data transmission (especially small data packets) gets spread over a larger portion of the frequency band and becomes more robust.

Figure 3:
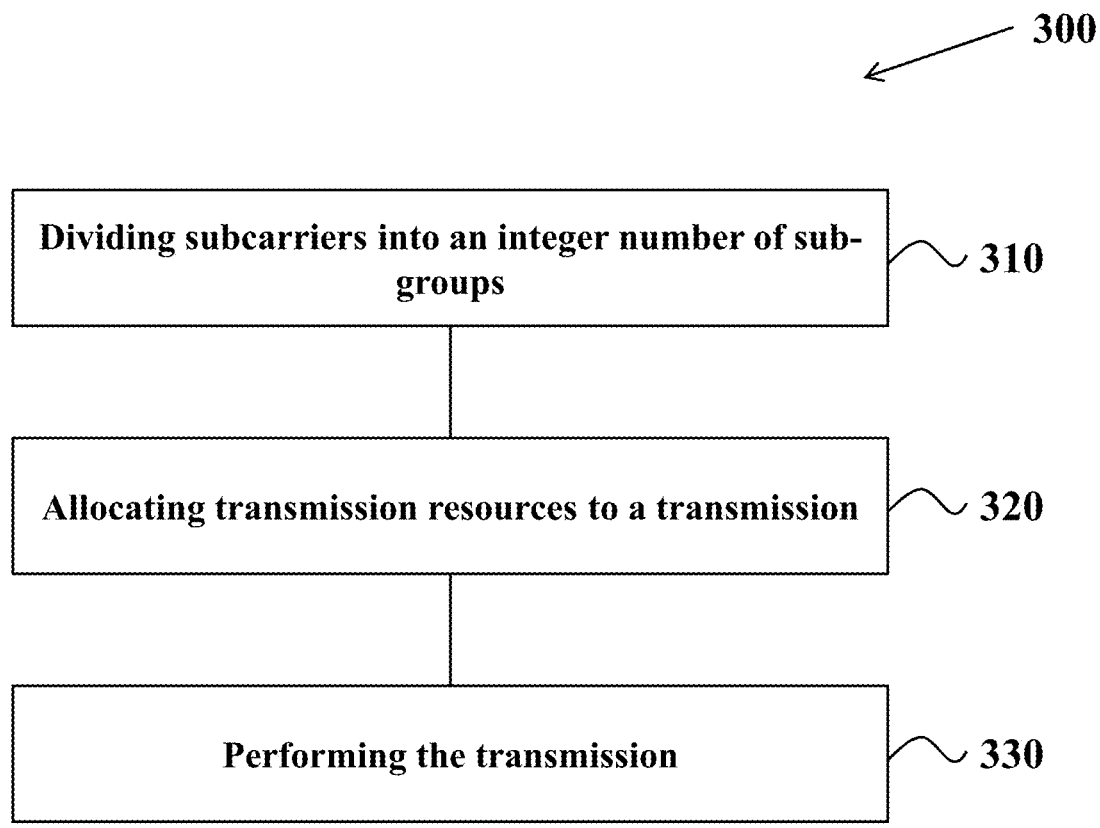
FIG. 3 is a flowchart representation of an example of a wireless communication method.

FIG. 3 shows a flowchart of an example method 300 of wireless communication. The method 300 may be implemented by a base station in a wireless communication system in which transmission resources are allocated on a per physical resource block (PRB) basis. As described herein, a PRB corresponds to a two dimensional resource pattern comprising a first number of subcarriers along a frequency dimension and a second number time slots along a time dimension.

The method 300 includes logically dividing (310) sub-carriers in each PRB into an integer number of sub-groups of sub-carriers, wherein the integer number is greater than one.

The method 300 further includes allocating (320), to a transmission, transmission resources corresponding to one or more of the sub-groups of subcarriers (also called sub-carriers).

The method 300 includes performing (330) the transmission in the wireless communication system. The wireless communication system may include a base station and one or more wireless terminals that are wirelessly communicating with the base station. The transmission is performed by radiating a signal over a wireless channel between the base station and the one or more wireless terminals. As disclosed throughout the document, the transmission may use an OTFS scheme in which an OTFS frame (delay-Doppler domain unit) may be assigned a subcarrier in each subgroup. Alternatively, dispersed OTFS may be used for performing the transmission. Alternatively, OFDM may be used for performing the transmission.

A dispersed OTFS modulation transmission may operate by replacing the physical delay-Doppler domain with a virtual domain named "Spread domain". This domain is may not be physically reciprocal to the time-frequency domain. Constellation symbols in this domain are converted to different symbols using an invertible transform and placed on non-regular resources in the time-frequency grid.

In some embodiments, the subcarriers in each group may be contiguous (e.g., FIG. 1 and FIG. 2). In some embodiments, the subcarriers in each group may be non-contiguous. The non-contiguous occurrence may be periodic or may be randomly placed along frequency domain. During operation, the transmission may be that of data, a control message, a system message or a reference signal or all of the above.

In some embodiments, the base station may determine the integer number of sub-groups based on a run-time condition of the wireless communication system. For example, when the run-time condition is such that at least one legacy wireless device is operating in the system, then the base station may perform a logical partition of the entire available resource pool such that one partition may use PRBs in the legacy manner while another partition may use the S-PRB technique disclosed in the present document. For example, in some embodiments, the run-time condition may relate to the estimate of channel characteristics such as variations in the channel response over the entire bandwidth. For example, the run-time condition may relate to the number of bits of message transmission. For example, for short, bursty transmissions, the base station may use S-PRB. Here, short or bursty transmissions may for example have duty cycles of between 1 to 10 percent of transmission time.

In some implementations, the integer number may be communicated, via an over the air transmission, to the user devices or terminals. This communication may be a higher layer message sent to the user device. Alternatively, the integer number may be programmed into the user device based on a pre-defined algorithm or rule.

In some embodiments, one of the reference signal transmitted may be a demodulation reference signal (DM-RS).

Figure 4:
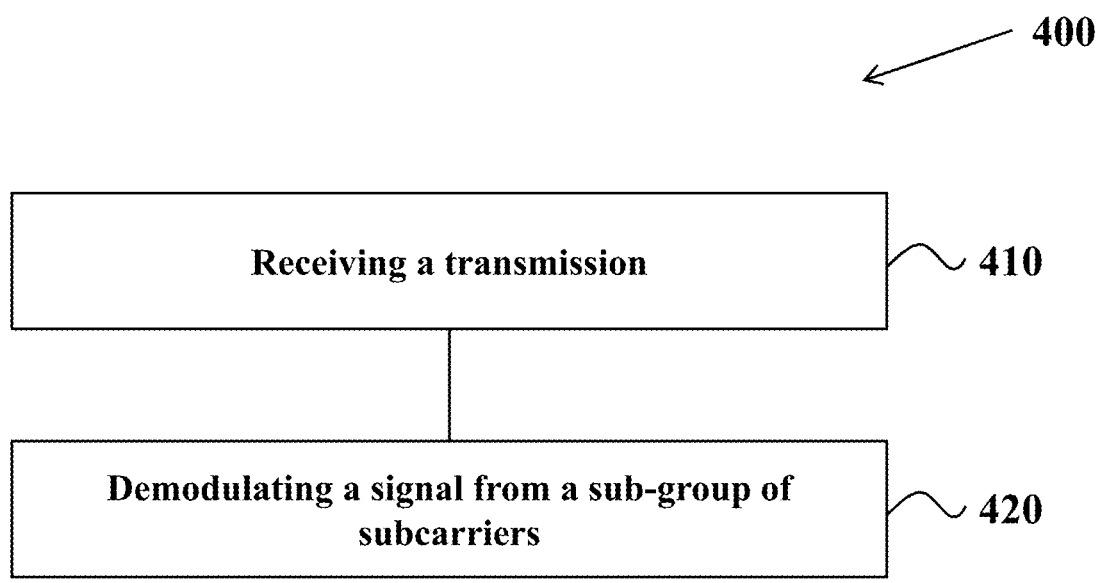
FIG. 4 is a flowchart representation of another example method of wireless communication.

FIG. 4 shows flowchart for an example method 400 of receiving signals in a wireless communication system in which transmission resources are allocated on a per physical resource block (PRB) basis, where a PRB corresponds to a two dimensional resource pattern comprising a first number of subcarriers along a frequency dimension and a second number time slots along a time dimension. The method 400 includes receiving (410) a transmission on a wireless channel, and demodulating (420) signals occupying sub-groups of subcarriers corresponding to one of a sub-group of subcarriers in which each PRB is logically divided, wherein each PRB is logically divided into an integer number of sub-groups of sub-carriers, wherein the integer number is greater than one.

In addition to the above described steps, various embodiments of the method 400 may include transmission of reference signals, data signals, system message signals or control signals, the use of non-contiguous bandwidth, and so on. Other features of the method 400 are similar to the description provided for the method 300.

The methods 300 or 400 may be implemented in a system that uses an OFDM modulation scheme, an OFDM-A modulation scheme, an OTFS transform based scheme or a dispersed OTFS transform based transmission signal.

Figure 5:
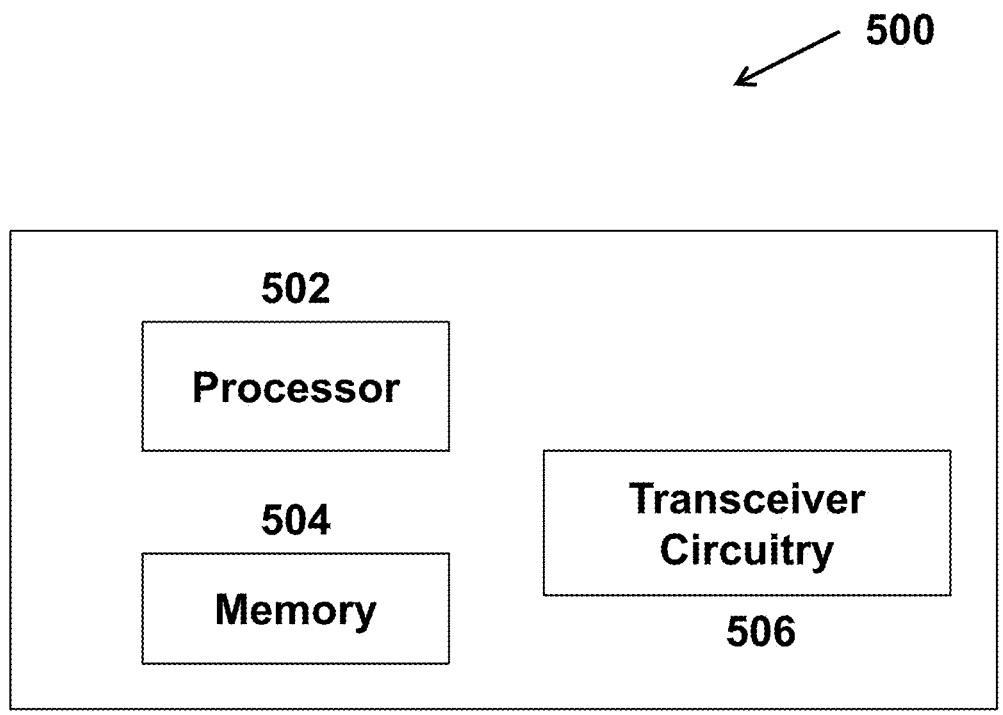
FIG. 5 shows an example of a wireless transceiver apparatus.

FIG. 5 shows an example of a wireless transceiver apparatus 500. The apparatus 500 may be used to implement various techniques described herein (including, but not limited to, methods 300 and 400. The apparatus 500 includes a processor 502, a memory 504 that stores processor-executable instructions and data during computations performed by the processor. The apparatus 500 includes reception and/or transmission circuitry 506, e.g., including radio frequency operations for receiving or transmitting signal and/or receiving data or information bits for transmission over a wireless network.

Figure 6:
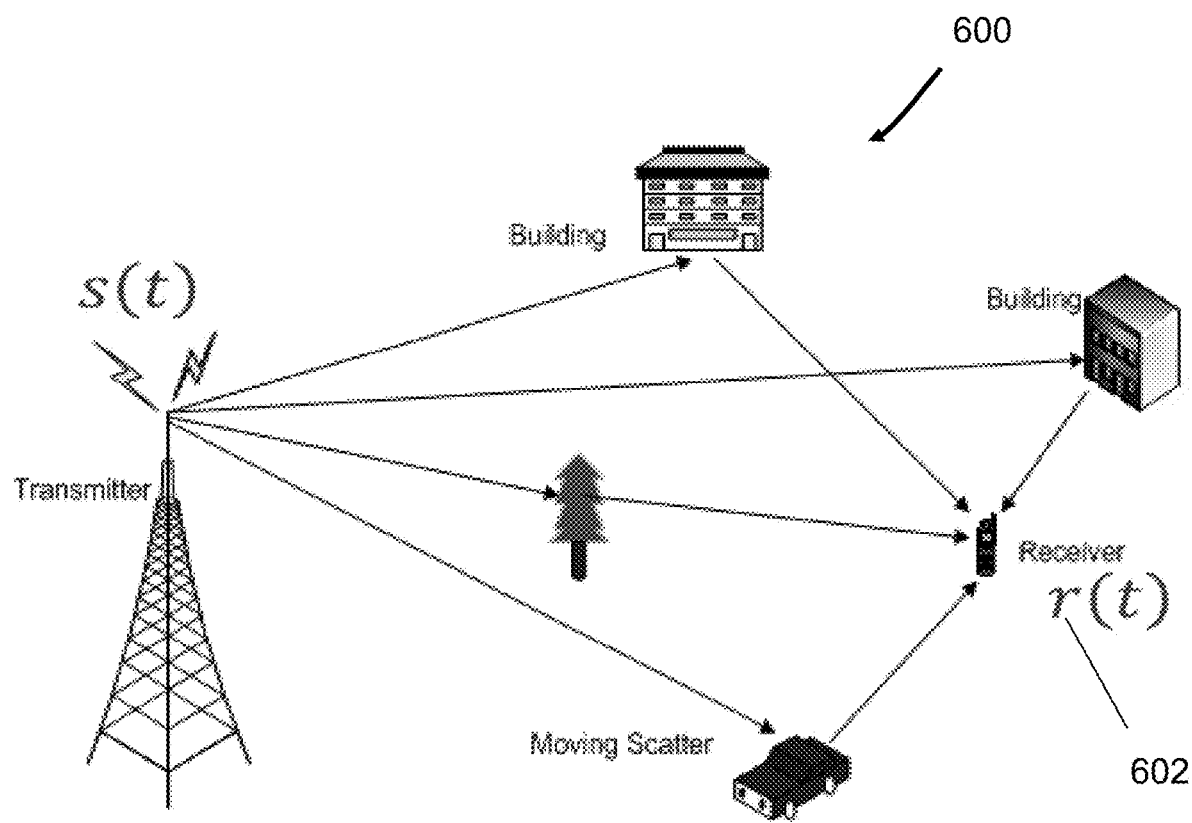
FIG. 6 shows an example communication network.

FIG. 6 shows an example communication network 600 in which the disclosed technologies can be implemented. The network 600 may include a base station transmitter that transmits wireless signals s(t) (downlink signals) to one or more receivers 602, the received signal being denoted as r(t), which may be located in a variety of locations, including inside or outside a building and in a moving vehicle. The receivers may transmit uplink transmissions to the base station, typically located near the wireless transmitter. The technology described herein may be implemented at a receiver 602 or at the transmitter (e.g., a base station).

It will be appreciated that techniques for splitting a PRB into smaller integer number of groups is disclosed. Using the disclosed technique, frequency diversity of a channel can be exploited to the advantage of performance of the network.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of wireless communication over a channel, comprising:
    determining, by a base station, that one or more characteristics of the channel satisfy a condition for using a split-physical resource block (split-PRB) mechanism, wherein the split-PRB mechanism is configured to logically divide each of a plurality of PRBs into an integer number of sub-groups of subcarriers, wherein each of the plurality of PRBs corresponds to a two-dimensional resource comprising a first number of subcarriers along a frequency dimension and a second number of time slots along a time dimension;
    configuring, based on the one or more characteristics of the channel, a waveform according to delay units and Doppler units;
    generating, based on the waveform, one or more signals; and
    transmitting the one or more signals using the split-PRB mechanism over the channel.

2. The method of claim 1, wherein the condition comprises a variability of the one or more characteristics of the channel exceeding a threshold.

3. The method of claim 1, wherein the one or more signals comprise a data signal, a control signal, a system message signal, or a reference signal.

4. The method of claim 3, wherein the reference signal is a demodulation reference signal.

5. The method of claim 1, wherein the waveform is an orthogonal time frequency space (OTFS) waveform or a dispersed OTFS (OTFS-D) waveform.

6. The method of claim 1, wherein the integer number is greater than one.

7. The method of claim 1, wherein a plurality of orthogonal time frequency space (OTFS) frames comprise the delay units and the Doppler units.

8. The method of claim 1, wherein the delay units and the Doppler units are represented in a two-dimensional delay-Doppler plane.

9. The method of claim 1, wherein the delay units and the Doppler units correspond to a resource in a two-dimensional delay-Doppler plane.

10. A method of wireless communication over a channel, comprising:
    receiving, by a wireless device from a base station, one or more signals over the channel via a split-physical resource block (split-PRB) mechanism,
    wherein the base station is configured to determine that one or more characteristics of the channel satisfy a condition for using the split-PRB mechanism, wherein the split-PRB mechanism is configured to logically divide each of a plurality of PRBs into an integer number of sub-groups of subcarriers, wherein each of the plurality of PRBs corresponds to a two-dimensional resource comprising a first number of subcarriers along a frequency dimension and a second number of time slots along a time dimension, wherein the one or more signals are based on a waveform, and wherein the waveform is configured, based on the one or more characteristics of the channel, according to delay units and Doppler units.

11. The method of claim 10, wherein the condition comprises a variability of the one or more characteristics of the channel exceeding a threshold.

12. The method of claim 10, wherein the one or more signals comprise a data signal, a control signal, a system message signal, or a reference signal.

13. The method of claim 10, wherein a plurality of orthogonal time frequency space (OTFS) frames comprise the delay units and the Doppler units.

14. The method of claim 10, wherein the delay units and the Doppler units (a) are represented in a two-dimensional delay-Doppler plane or (b) correspond to a resource in a two-dimensional delay-Doppler plane.

15. A wireless signal transmission apparatus, comprising:
a memory;
a processor;
and transmission circuitry,
wherein the apparatus configured to implement a method comprising:
determining that one or more characteristics of the channel satisfy a condition for using a split-physical resource block (split-PRB) mechanism, wherein the split-PRB mechanism is configured to logically divide each of a plurality of PRBs into an integer number of sub-groups of subcarriers, wherein each of the plurality of PRBs corresponds to a two-dimensional resource comprising a first number of subcarriers along a frequency dimension and a second number of time slots along a time dimension;
configuring, based on the one or more characteristics of the channel, a waveform according to delay units and Doppler units;
generating, based on the waveform, one or more signals; and
transmitting the one or more signals using the split-PRB mechanism over the channel.

16. The apparatus of claim 15, wherein the condition comprises a variability of the one or more characteristics of the channel exceeding a threshold.

17. The apparatus of claim 15, wherein the one or more signals comprise a data signal, a control signal, a system message signal, or a reference signal.

18. The apparatus of claim 15, wherein the waveform is an orthogonal time frequency space (OTFS) waveform or a dispersed OTFS (OTFS-D) waveform.

19. The apparatus of claim 15, wherein the delay units and the Doppler units are represented in a two-dimensional delay-Doppler plane.

20. The apparatus of claim 15, wherein the delay units and the Doppler units correspond to a resource in the two-dimensional delay-Doppler plane.

* * * * *